United States Patent [19]

Cecchi

[11] 4,069,003
[45] Jan. 17, 1978

[54] INJECTION MOLDING APPARATUS
[75] Inventor: Ronald L. Cecchi, Brookfield, Ill.
[73] Assignee: Dinamode Corporation, Villa Park, Ill. ; a part interest
[21] Appl. No.: 569,811
[22] Filed: Apr. 21, 1975
[51] Int. Cl.² .............................................. B29F 1/03
[52] U.S. Cl. .................................. 425/568; 425/549; 425/DIG. 227
[58] Field of Search ................ 249/205, 105; 164/303, 164/244, 122, 127; 425/DIG. 227, 247, 242, 242 R; 264/328, 329; 16/2

[56]  References Cited
U.S. PATENT DOCUMENTS

| 235,476 | 12/1880 | White | 249/105 |
| 2,511,350 | 6/1950 | Kosobut | 249/205 |
| 3,822,856 | 7/1974 | Gellert | 249/105 |

FOREIGN PATENT DOCUMENTS

| 996,244 | 12/1951 | France | 425/247 |
| 437,463 | 3/1968 | Japan | 425/247 |

Primary Examiner—Robert D. Baldwin
Assistant Examiner—William R. Briggs
Attorney, Agent, or Firm—David D. Kaufman

[57] ABSTRACT

A method and apparatus for the injection molding of plastics wherein the sprue bushing is provided with a plurality of grooves in its bore as contrasted with the conventional sprue bushings having smooth bores. The sprue formed is complementarily ribbed and these irregular surfaces speed cooling of the sprue and facilitate manual handling thereof.

1 Claim, 7 Drawing Figures

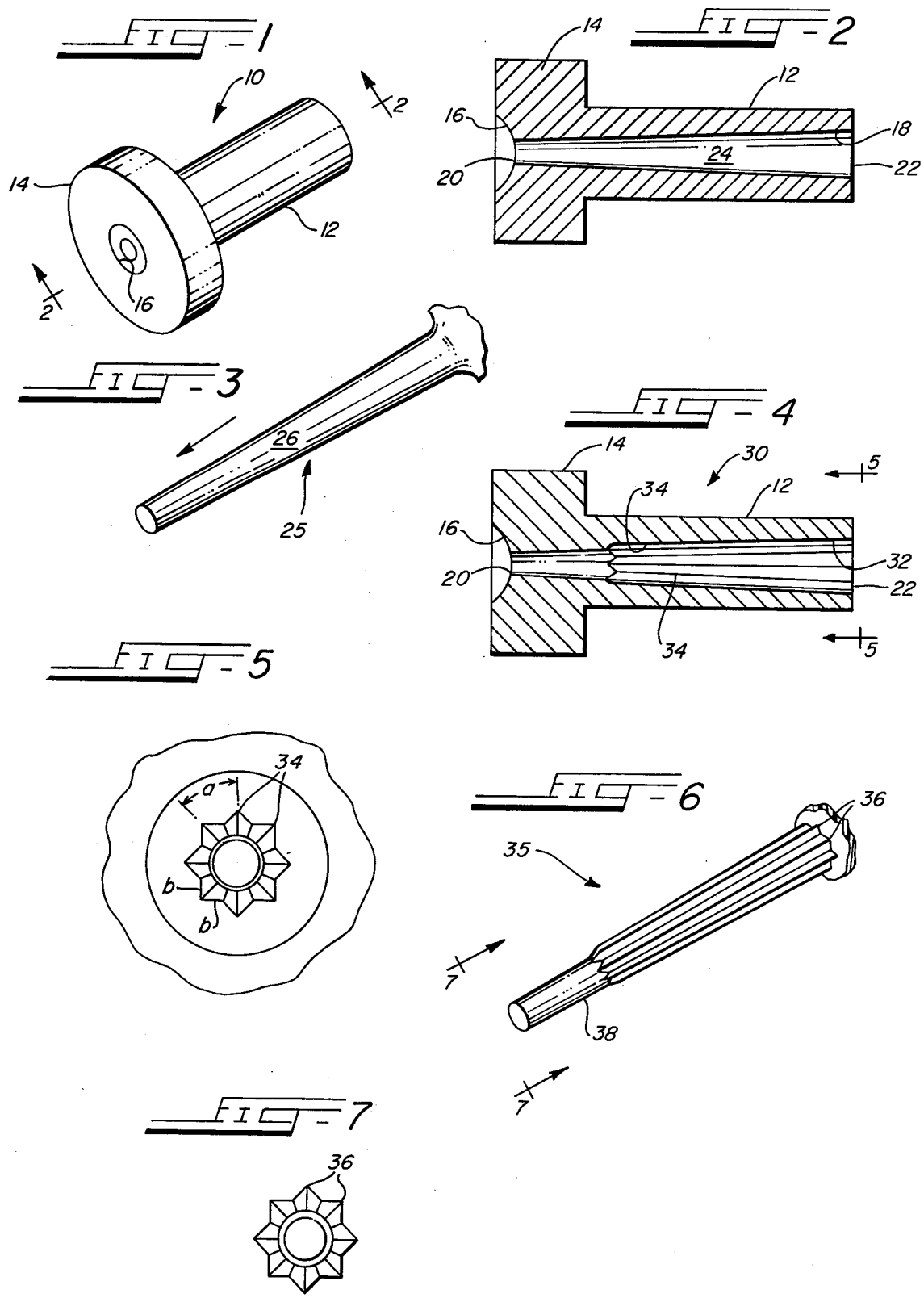

INJECTION MOLDING APPARATUS

This invention relates to injection molding of plastics and more particularly to an apparatus for increasing the efficiency of such operations by shortening the cooling periods and facilitating the handling of the molded parts and removal thereof from the mold.

Injection molding is employed extensively in the manufacture of a wide variety of plastic articles. It is especially advantageous for the manufacture of relatively small and inexpensive articles which must nonetheless be produced in multiples or large quantities. Merely representative of such articles are bearings, gears, washers, wheels, buttons, handles, straps, and the like, designed for use as component parts in larger assembled structures. Also, complete articles, such as combs, brushes, toys, tags, etc.

Basically, injection molding involves a heated cylinder or plasticating chamber in which pellets of the particular polymer, e.g. nylons, polystyrenes, polypropylenes, polyvinyls, etc., are heated above the melting point into a viscous liquid mass. The cylinder is equipped with a nozzle and a screw or ram is provided internally for ejecting the molten mass from the nozzle. The molten polymer is injected into a mold which is generally made of tool steel to withstand high clamping forces and injection pressures. Typically, a mold may comprise two plates, a male or core and a female or stationary plate, and it may include multiple cavities and an intricate runner system made possible by the ability of molten polymers to flow over relatively long distances.

Entry of the molten mass into the mold is through a tapered orifice known as a sprue bushing. The inner end of the sprue bushing communicates with the mold cavity or the runners which feed multiple cavities, while the outer end is mated to the nozzle of the plasticating chamber. With each molding cycle, the mold is completely filled with a charge or shot of molten plastic and the portion of the shot which is formed by the sprue bushing is known as the sprue. The presence of the sprue and its physical characteristics and relation to the other parts formed in the mold contribute to some of the problems overcome or alleviated by this invention.

In any injection molding operation, the polymer melt in the mold must be allowed to cool long enough to reach a sufficiently rigidified state so that the molded article may be readily removed from the mold and resistant to deformation during subsequent post-molding operations. In applications of the type alluded to, however, molding cycle time literally becomes critical for obvious economic reasons, and any reduction of this time without adverse effect on the final product is much to be desired.

It will be appreciated that the sprue is the last section of a shot to be molded and therefore has the least time to cool. Moreover, sprues generally have a larger cross section than the runners, gates and parts, as dictated by injection pressure requirements. Indeed, it may be stated that the mold-closed or cooling time of a molding cycle is actually determined by the length of time it takes for the sprue to cool. Of course, any attempts to part the mold before sufficient cooling of the sprue will result in the sprue sticking to the bushing and failing to release therefrom. Even if such an insufficiently cooled sprue does release, there is a likelihood it will become warped or distorted to a point that makes it difficult or impossible to load the same into fixtures of the type employed in post-molding operations such as removal and trimming of the parts.

It is, therefore, a principal object of this invention to provide an injection molding method and apparatus which shorten the cooling time required for each individual molding cycle. A related object is to provide such a method and apparatus which serve effectively to speed up cooling of the sprue.

Sprue bushings are standard, in-stock articles of commerce and are made in a variety of sizes and proportions to suit individual mold and press requirements. Generally, they comprise an integral cylindrical shank and enlarged head precision machined to close tolerances of hardened, ground and polished steel. Internally, they are formed with a smooth and polished tapering bore and, as already described, it is the tapered bore which forms the sprue.

It is therefore another important object of this invention to provide an injection molding method of the character described in which conventional sprue bushings may be utilized after modification in the manner to be subsequently described.

Another object is to provide a new and modified sprue bushing structure which may be utilized in the method and to achieve the objectives described.

Additional problems of worker safety and overall efficiency are encountered with current injection molding techniques where the molding machine is manually operated. In such operations the machine operator must hand-grasp each completed shot by the sprue in order to remove it from the mold and transfer it to the next operation station. Understandably, the sprue produced by the conventional bushing is highly polished, tapered and circular in cross-section, that is, frusto-conical. That form is relatively slick and difficult to hand-grasp, especially when made of a low friction material such as nylon. Consequently, the machine operator is compelled to tightly grip the still-hot sprue (typically around 275° to 300° F) with considerable finger and hand contact. The result is frequent blisters and burns even where expedients like gloves, tape and bandages are employed. Obviously, such injuries likewise affect the overall efficiency of the operation.

It is, therefore, still a further object of the invention to provide an injection molding method and apparatus of the character described which diminish greatly the risk of burns and similar injuries to machine operators and simultaneously improves overall efficiency of the molding operation. In this regard, the invention teaches a sprue bushing structure which produces a sprue having a ribbed or irregular surface so that there is greatly reduced surface contact when hand-grasped.

Yet another object is to provide an injection molding method and apparatus of the character described producing a sprue which is more resistant to warping and inadvertent bending or other damage in post-molding handling.

With the foregoing and other objects in view which will appear as the description proceeds, the invention comprises generally the use with injection molds of a sprue bushing having a bore structure which departs from that of conventional bushings. Instead of the conventional smooth, frusto-conical bore surface, the invention teaches an irregular bore surface, namely one having a plurality of longitudinal cut-outs or grooves formed therein. The sprue formed by the bushing correspondingly has an irregular outer surface, namely one having a plurality of ridges or ribs. The grooved sprue bushing bore and ribbed sprue result in demonstrably faster cooling of the sprue, which latter is also additionally rigidified by the ribs.

For the purpose of facilitating an understanding of my invention, I have illustrated in the accompanying drawings a preferred embodiment thereof, from an inspection of which, when considered in connection with the following description, my invention and many of its advantages should be readily understood and appreciated.

Referring to the drawings in which the same reference characters are employed to indicate corresponding or similar part throughout the several figures of the drawings:

FIG. 1 is perspective view of a conventional sprue bushing;

FIG. 2 is a longitudinal sectional view of the bushing of FIG. 1;

FIG. 3 is a perspective view of a sprue formed by the conventional bushing shown broken off from the runner or part to which it is normally attached;

FIG. 4 is a longitudinal sectional view of a sprue bushing made in accordance with the principles of the invention;

FIG. 5 is an enlarged end view seen from the direction indicated in FIG. 4;

FIG. 6 is a perspective view of a sprue formed by the bushing of the invention with the normally connected runner or part broken off; and FIG. 7 is an enlarged end view seen from the direction indicated in FIG. 6.

Referring more particularly to FIGS. 1 and 2 of the drawings, reference character 10 indicates generally a conventional sprue bushing of the type in widespread use. Such bushings are available in many sizes and proportions to suit specific molding applications, but the basic structure is in all cases the same. Bushing 10 comprises a cylindrical body member having an inner shank portion 12 and an outer, enlarged diameter head portion 14. The head portion 14 is adapted to mate with the nozzle of the plasticating chamber and, for this purpose, may be provided with a spherical recess 16.

Internally, the bushing 10 is formed with a central bore 18 concentric about the longitudinal axis of the bushing. The bore 18 flares or tapers outwardly from the injection end 20 to the inner end 22 which normally will be in contact with a mold cavity or runner system when operationally positioned in a mold. The bore 18 thus is defined by a smooth, frusto-conical inner surface 24.

In FIG. 3, there is illustrated a sprue 25 formed by the bushing 10. The sprue 25 comprises a tapering frusto-conical surface 26 corresponding to the bore surface 24. Manual removal of the molded shot from the mold requires that the sprue 25 be grasped and pulled to the left as indicated by the arrow. It will be appreciated that the smooth and tapered shape of the sprue 25 makes good purchase thereof difficult, especially if the molding material is a low-friction plastic like nylon. As a result, the operator is compelled to grip the still-hot sprue rather tightly, thereby making much finger contact with the substantially circular surface 26. In addition, the relatively slender, frusto-conical sprue 25 is readily subject to warpage or bending forces normal to its longitudinal axis.

In FIGS. 4 and 5 there is illustrated a sprue bushing 30 which may comprise generally a conventional bushing such as the bushing 10, but whose inner bore structure has been modified in accordance with the teachings of the invention. Thus, in the embodiment illustrated, bushing 30 comprises an inner shank portion 12, an enlarged diameter head portion 14 and a spherical recess 16. Similarly, bushing 30 comprises a central bore 32 which flares longitudinally from the outer end 20 of the bushing to the inner end 22 thereof.

It is important to note that the inner surface of the bore 32 is not smoothly frusto-conical as in the case of the bore 18. Instead, bore 32 is formed with a plurality of cut-outs or grooves 34 which extend from the inner end 22 of the bushing longitudinally over a substantial portion of the length thereof. For reasons which will become apparent below, I prefer that the grooves 34 be sharply angular in profile (see FIG. 5), although they might also be arcuate if desired or convenient.

The grooves 34 may be formed or cut in the sprue bushing in a variety of ways. For example, it might be possible to initially cast the bushings with the grooves formed therein. Some of the so-called non-traditional machining processes, such as electro-chemical machining, ultrasonic machining and electrical discharge machining, may likewise be employed to cut the grooves in a conventional sprue bushing. I prefer to cut the grooves and their configuration into a conventional, commercially available bushing by the electrical discharge method in manner well known to those versed in the machining arts.

A sprue 35 is formed by the bushing 30 and has the general form illustrated in FIGS. 6 and 7. Sprue 35 comprises a broken or irregular outer surface having a plurality of angular ridges or ribs 36. The apices of the ribs 36 are raised substantially from the central mass of the sprue 35, of which the still smooth portion 38 is an extension. When an operator grips the ribbed sprue 35, as required for manual removal of the shot from the mold, the amount of finger contact with the still-hot sprue is greatly reduced. In most cases, there will be finger contact only with the sharp apices of two diametrically opposed ribs 36.

Other unexpected benefits result from the novel ribbed sprue-grooved bushing relationship. For example, temperature tests were conducted with a press molding type 6/6 nylon, melt temperature 565° F, mold temperature 190° F and overall molding cycle time of 13 seconds, conditions which may be considered as typical. Five seconds after ejection, the surface temperature of the smooth conventional sprues was 285° F ± 5°. Under the same conditions, the surface temperature of the ribbed sprues was 35° to 40° lower.

In addition, the ribs 36 serve to rigidify the sprue 35. As a result, warpage or inadvertent bending of the sprue is virtually eliminated.

The number of grooves 34 (and corresponding ribs 36) may vary as well as their design and arrangement depending on such factors as sprue size and manufacturing difficulties, and all exhibit improved results over the conventional smooth frusto-conical form. However, I have found the most efficient arrangement to be one in which there are eight equally spaced grooves 34, that is, where the angle "a" between adjacent grooves is approximately 45°, and wherein the sides "b" of each groove describe an angle of approximately 90°.

I claim:

1. A sprue bushing for use with a mold in plastics injection molding operations wherein a sprue is integrally formed at each injection with the part being molded, said sprue bushing comprising:

a generally cylindrical body member having an inner end, an outer injection end, and a longitudinal frusto-conical bore extending therethrough between said ends, said bore being concentric with the central longitudinal axis of the body member and tapering outwardly toward said inner end, and a plurality of straight elongate grooves formed in the wall of said bore extending longitudinally over at least 50% of the length thereof and converging toward said injection end, adjacent sides of adjacent grooves converging to apices at a first radial distance from the central longitudinal axis of the bore, and sides of each groove converging to points at a radial distance from the central longitudinal axis substantially greater than said first radial distance, said grooves thereby increasing the surface area of the bore to enhance heat transfer and producing a sprue which is readily released from the bushing with simple longitudinal and non-rotational relative movement therebetween.

* * * * *